US007796828B2

(12) United States Patent
Han et al.

(10) Patent No.: US 7,796,828 B2
(45) Date of Patent: Sep. 14, 2010

(54) APPARATUS FOR FILTERING MALICIOUS MULTIMEDIA DATA USING SEQUENTIAL PROCESSING AND METHOD THEREOF

(75) Inventors: Seung Wan Han, Gwangjoo (KR); Chi Yoon Jeong, Daejeon (KR); SuGil Choi, Busan (KR); Taek Yong Nam, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 924 days.

(21) Appl. No.: 11/633,989

(22) Filed: Dec. 5, 2006

(65) Prior Publication Data

US 2007/0233735 A1    Oct. 4, 2007

(30) Foreign Application Priority Data

Dec. 8, 2005    (KR)    ...................... 10-2005-0119996

(51) Int. Cl.
G06K 9/46    (2006.01)
G06K 9/62    (2006.01)

(52) U.S. Cl. ...................................... 382/260; 382/224
(58) Field of Classification Search ................. 382/159, 382/190, 224, 260, 100; 725/25
See application file for complete search history.

(56) References Cited

U.S. PATENT DOCUMENTS 6,115,057 A * 9/2000 Kwoh et al. .................. 725/28

7,383,282 B2 * 6/2008 Whitehead et al. ......... 707/104.1
2002/0147782 A1 * 10/2002 Dimitrova et al. ........... 709/207
2003/0121035 A1 * 6/2003 Ro ............................... 725/28
2005/0108227 A1 * 5/2005 Russell-Falla et al. ......... 707/5
2006/0031870 A1 * 2/2006 Jarman et al. ................. 725/25
2006/0068806 A1 * 3/2006 Nam et al. ............... 455/452.2

FOREIGN PATENT DOCUMENTS

KR    1020040046537    6/2004

OTHER PUBLICATIONS

Zheng, et al. "Blocking objectionable images: Adult images and harmful symbols", IEEE, pp. 12231226, 2004.*

* cited by examiner

*Primary Examiner*—Daniel G Mariam
(74) *Attorney, Agent, or Firm*—Ladas & Parry LLP

(57) ABSTRACT

An apparatus for filtering malicious multimedia data using sequential processing and a method thereof are provided. The apparatus includes: a maliciousness classification model training unit extracting a predetermined feature from at least one or more types of moving pictures and then, through machine training, generating a maliciousness determination model for each of at least one or more classes; a malicious data classification unit sequentially inputting input moving pictures for which maliciousness is required to be determined, to the maliciousness determination model, and determining the maliciousness class of the input moving pictures, based on a probability that data at a determination time of the input moving pictures belongs to a predetermined maliciousness class, and an accumulated maliciousness probability to a current time; and a malicious information filtering unit cutting off service if the maliciousness class belongs to a predetermined reference maliciousness class.

12 Claims, 8 Drawing Sheets

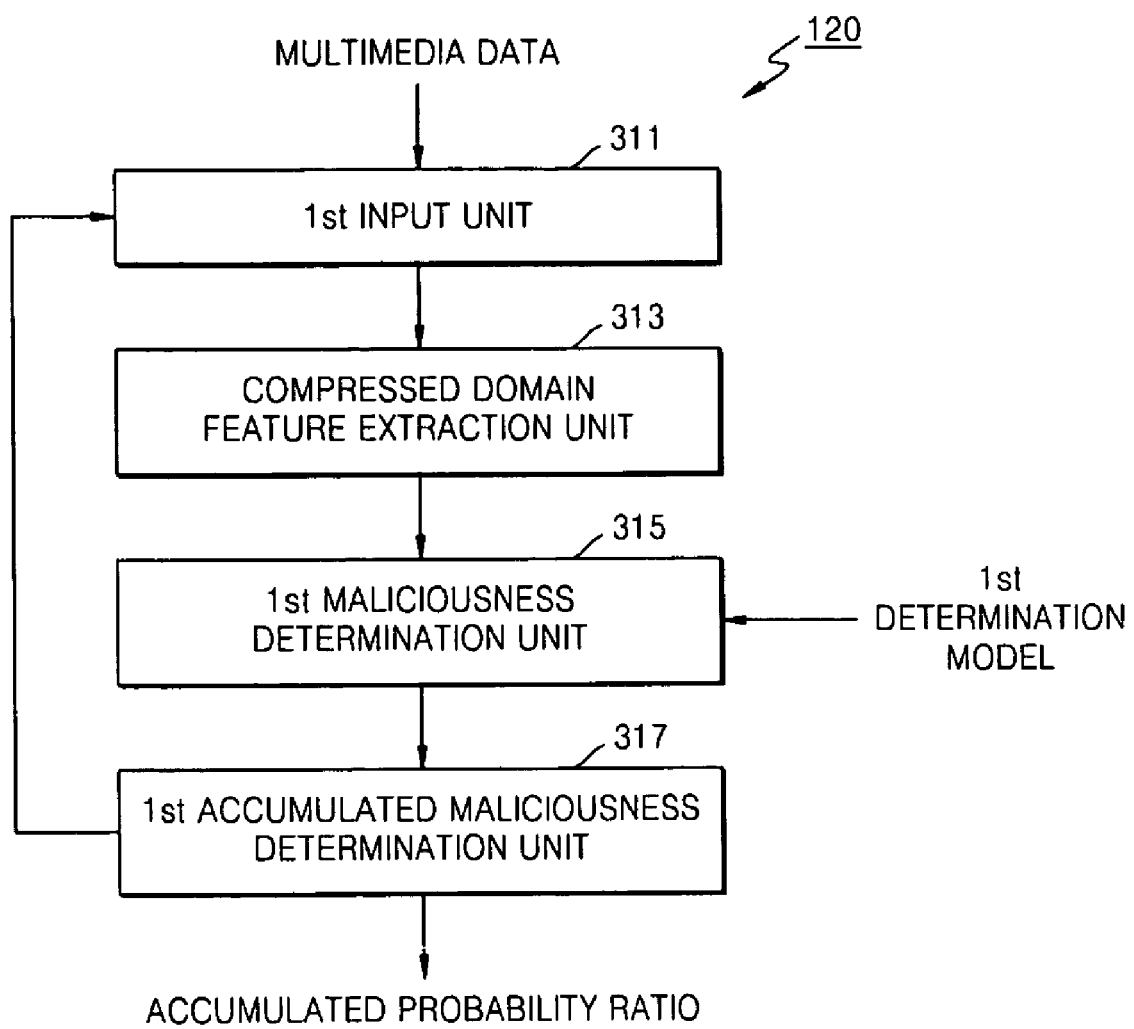

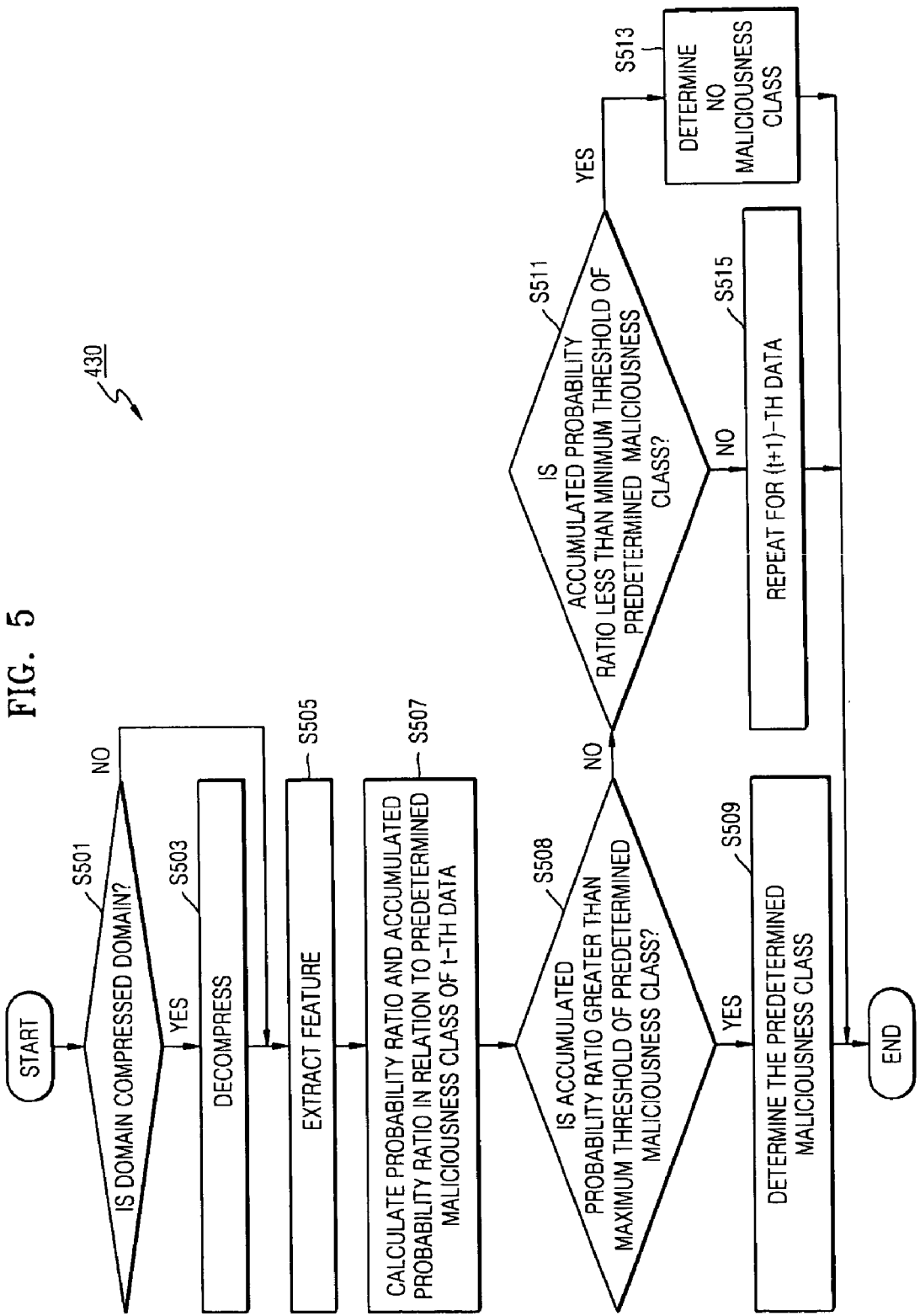

APPARATUS FOR FILTERING MALICIOUS MULTIMEDIA DATA USING SEQUENTIAL PROCESSING AND METHOD THEREOF

CROSS-REFERENCE TO RELATED PATENT APPLICATIONS

This application claims the benefit of Korean Patent Application No. 10-2005-0119996, filed on Dec. 8, 2005, in the Korean Intellectual Property Office, the disclosure of which is incorporated herein in its entirety by reference.

BACKGROUND OF THE INVENTION

1. Field of the Invention

The present invention relates to an apparatus for filtering a malicious multimedia service based on sequential data processing and a method thereof. More particularly, according to the apparatus and method, multimedia data existing in a variety of forms, including multimedia streaming transmitted online in real time, a multimedia file existing in a storage space and being reproduced, and a multimedia file existing in a storage space, is sequentially input, and a maliciousness class ratio is calculated by using a maliciousness class classification model trained in advance. Then, if the accumulated value of the ratio is equal to or greater than a predetermined class, it is determined that the multimedia data is the maliciousness class. If the accumulated value is equal to or less than the minimum threshold of the predetermined class, it is determined that the multimedia data is another class. If the accumulated value is between the maximum threshold value and the minimum threshold value, an input of next data is received and a maliciousness class ratio is calculated. Then, an accumulated value is again calculated and a maliciousness class is determined in the same manner.

2. Description of the Related Art

Thanks to the recent widespread Internet use and increase in the data transmission speed, real-time multimedia services, such as audio on demand (AOD), video on demand (VOD), e-learning, and online-media, and non-real-time multimedia services in which multimedia data is received though P2P or other Internet service, stored in a PC, and reproduced, have been increasing. Among these services, cyber education, online news, and online theaters provide positive effect in the social, economical, and academic aspects, but malicious multimedia services operating with commercial purposes have bad influences on the Internet users who are not matured and have less judgment and self-control power. In particular, in case of multimedia services, the influences and side effects on the users are greater than the conventional text information services. Accordingly, a method of filtering the malicious multimedia information so that juveniles or users who don't want such services cannot be exposed to the malicious information is needed.

Among the conventional methods of determining the maliciousness of multimedia services, the mainstream methods were that by using additional text information, such as service names and explanations existing in the header of a service, rather than the contents of the services, the text information is compared to malicious word dictionaries for keyword matching. Since these methods are not determination methods based on the contents of malicious multimedia services, there are ways to easily avoid the maliciousness determination methods and these methods cannot be quite effective.

In order to solve this problem, a method of receiving the entire data of a multimedia service and by extracting and analyzing a feature (for example, the ratio of the presence of a predetermined color) from the entire data, determining the maliciousness of the multimedia service, has been introduced. Since all data of the multimedia service should be received and then analyzed according to this method, the method has a disadvantage that it requires a large storage space and much time to determine maliciousness. Also, since it uses a very simple feature in the determination of maliciousness, the performance of the classification is low. Furthermore, it has another problem that the determination is performed after the malicious multimedia is fully exposed to the user.

To solve this problem, there is a method by which data is received in real time, and then, data items are processed one by one to determine the maliciousness and then filtered. However, this method has a low classification performance because a simple feature of data at an examination time is used for determining maliciousness. Furthermore, since it cannot apply the continuous features of data received to the time of examination, harmless data is mistaken as malicious data, or malicious data is mistaken as harmless data and then exposed to the users.

SUMMARY OF THE INVENTION

The present invention provides an apparatus and method by which in relation to multimedia data existing in a variety of forms, including multimedia streaming transmitted in real time, and a multimedia file existing in a storage space and being reproduced, by sequentially processing the data using a sequential data processing technique, malicious multimedia services are classified in real time and filtered.

According to an aspect of the present invention, there is provided a malicious multimedia filtering apparatus based on sequential data processing, the apparatus including: a maliciousness classification model training unit extracting a predetermined feature from at least one or more types of moving pictures and then, through machine training, generating a maliciousness determination model for each of at least one or more classes; a malicious data classification unit sequentially inputting input moving pictures for which maliciousness is required to be determined, to the maliciousness determination model, and determining the maliciousness class of the input moving pictures, based on a probability that data at a determination time of the input moving pictures belongs to a predetermined maliciousness class, and an accumulated maliciousness probability to a current time; and a malicious information filtering unit cutting off the service if the maliciousness class belongs to a predetermined reference maliciousness class.

BRIEF DESCRIPTION OF THE DRAWINGS

The above and other features and advantages of the present invention will become more apparent by describing in detail exemplary embodiments thereof with reference to the attached drawings in which:

FIG. 3A is a block diagram of a detailed structure of a malicious data classification unit of FIG. 1 according to an embodiment of the present invention;

FIG. 5 is a detailed flowchart of an operation for determining whether or not moving pictures belong to a maliciousness class of FIG. 4 according to an embodiment of the present invention;

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
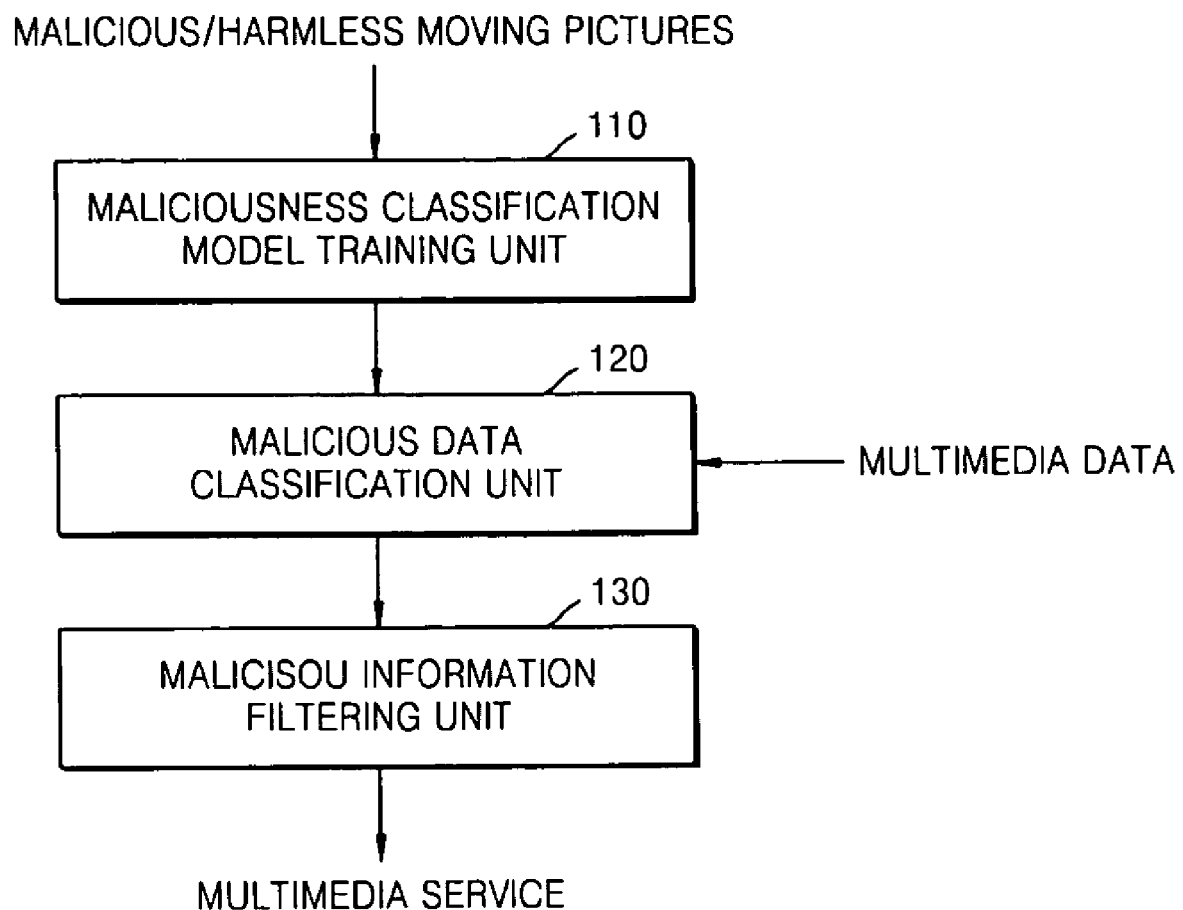
FIG. 1 is a block diagram of a structure of an apparatus for filtering a malicious multimedia service based on sequential data processing according to an embodiment of the present invention.
Figure 2:
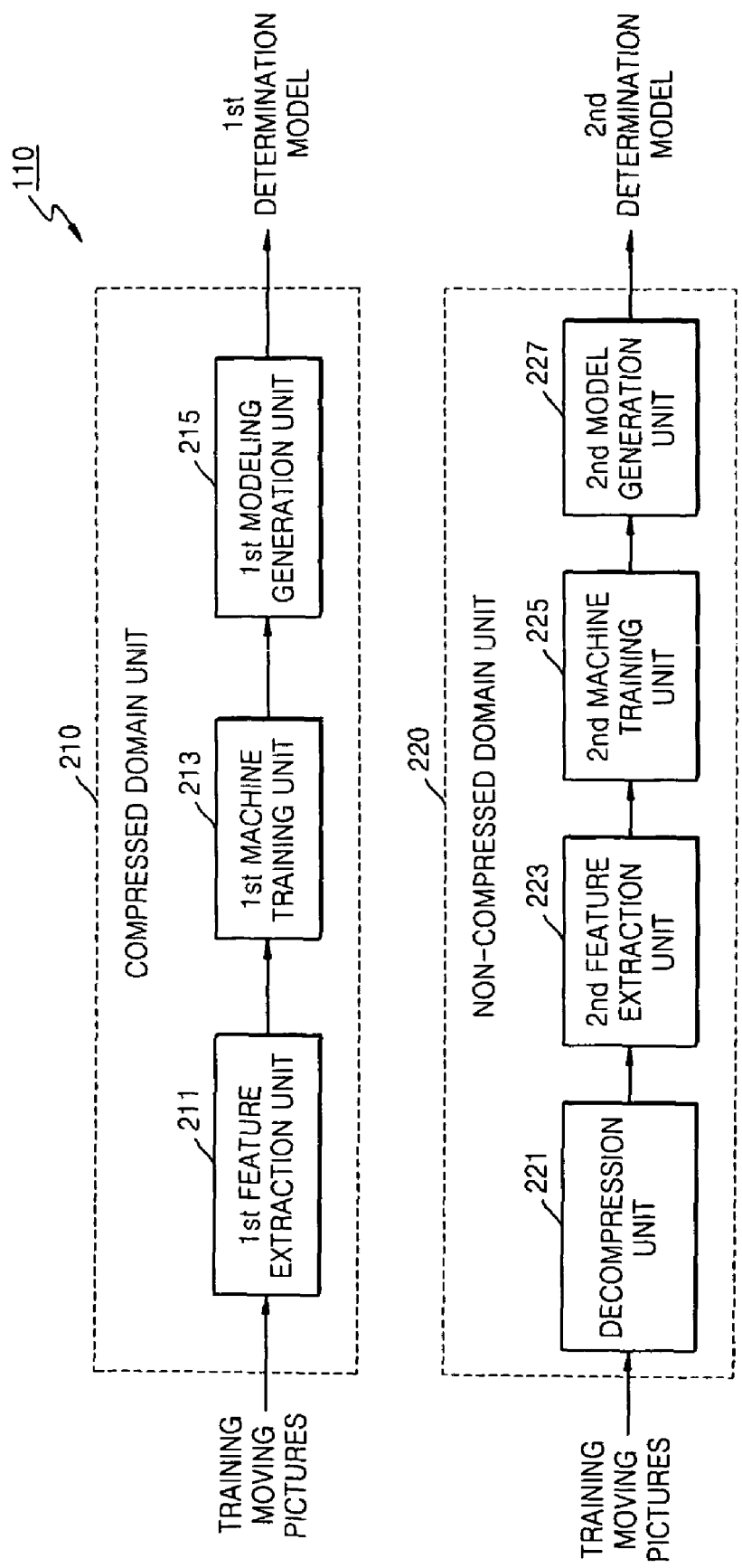
FIG. 2 is a block diagram of a detailed structure of a maliciousness classification model training unit of FIG. 1 according to an embodiment of the present invention.

FIG. 1 is a block diagram of a structure of an apparatus for filtering a malicious multimedia service based on sequential data processing according to an embodiment of the present invention. FIG. 2 is a block diagram of a detailed structure of a maliciousness classification model training unit 120 of FIG. 1, and FIGS. 3A through 3C are block diagrams of a variety of detailed structures of a malicious data classification unit 120 of FIG. 1.

Figure 4:
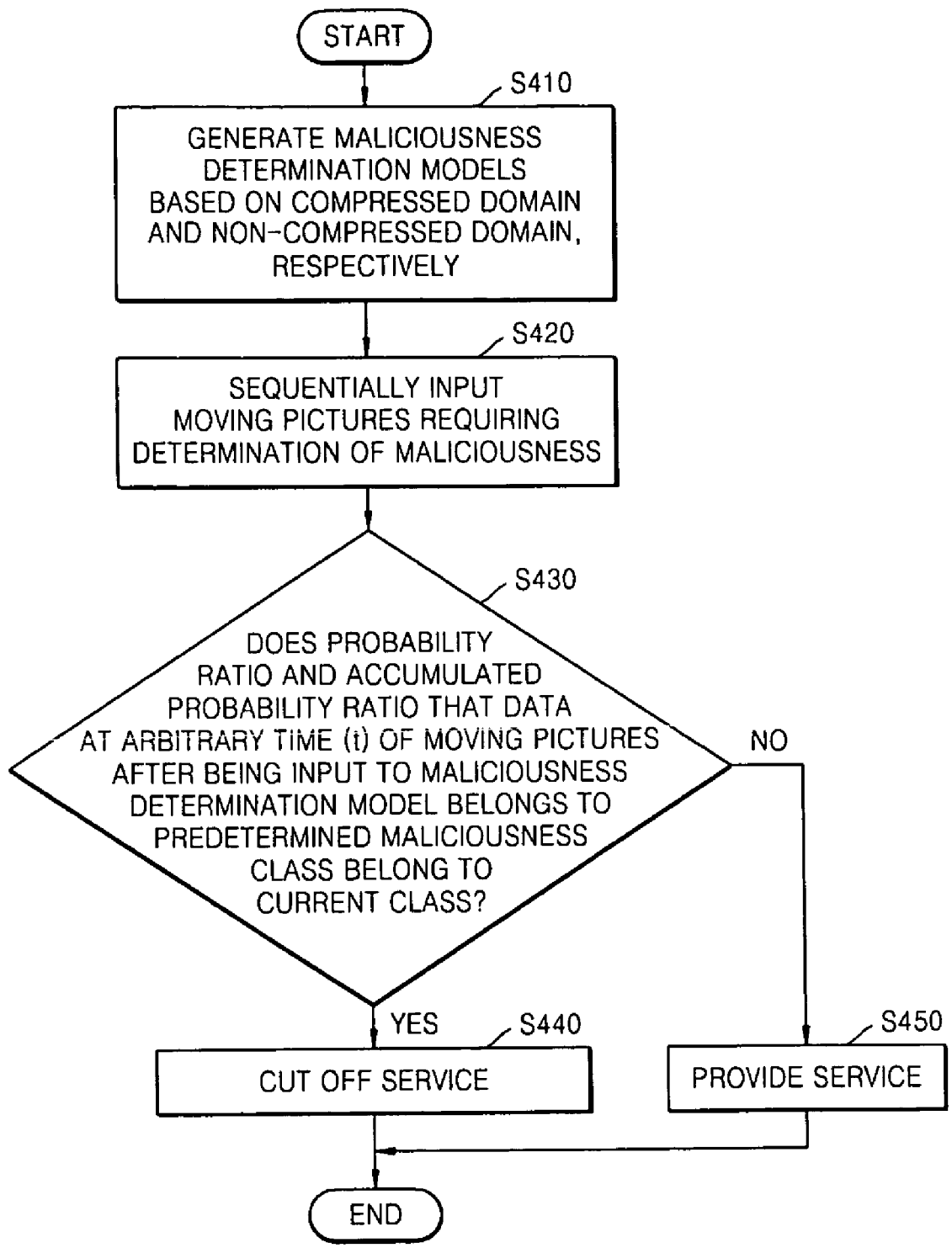
FIG. 4 is a flowchart of a method of filtering a malicious multimedia service based on sequential data processing according to an embodiment of the present invention.
Figure 6A:
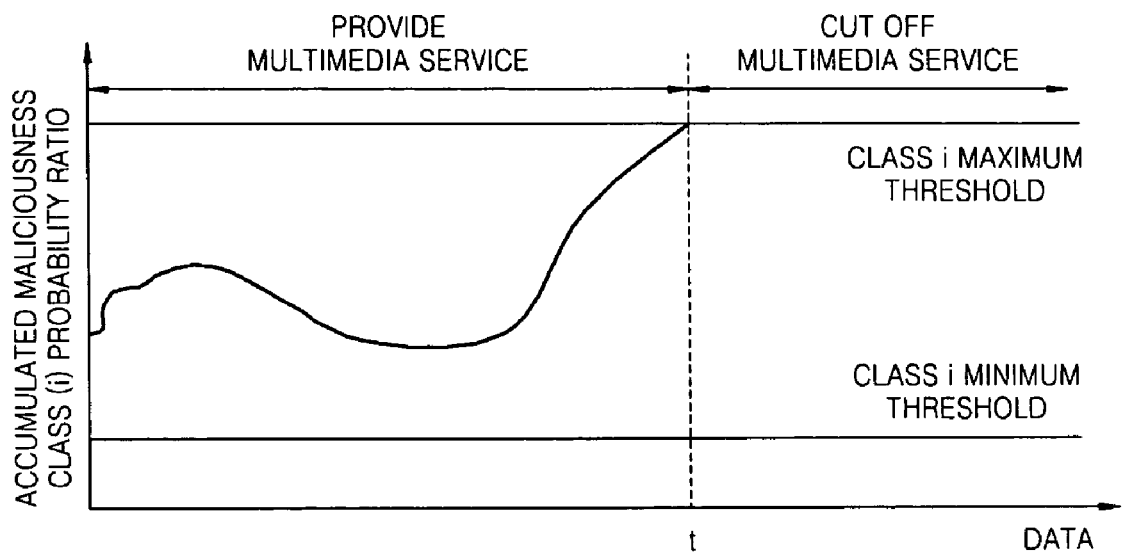
FIG. 6A illustrates a result of providing a service with filtering malicious moving pictures according to an embodiment of the present invention.
Figure 6B:
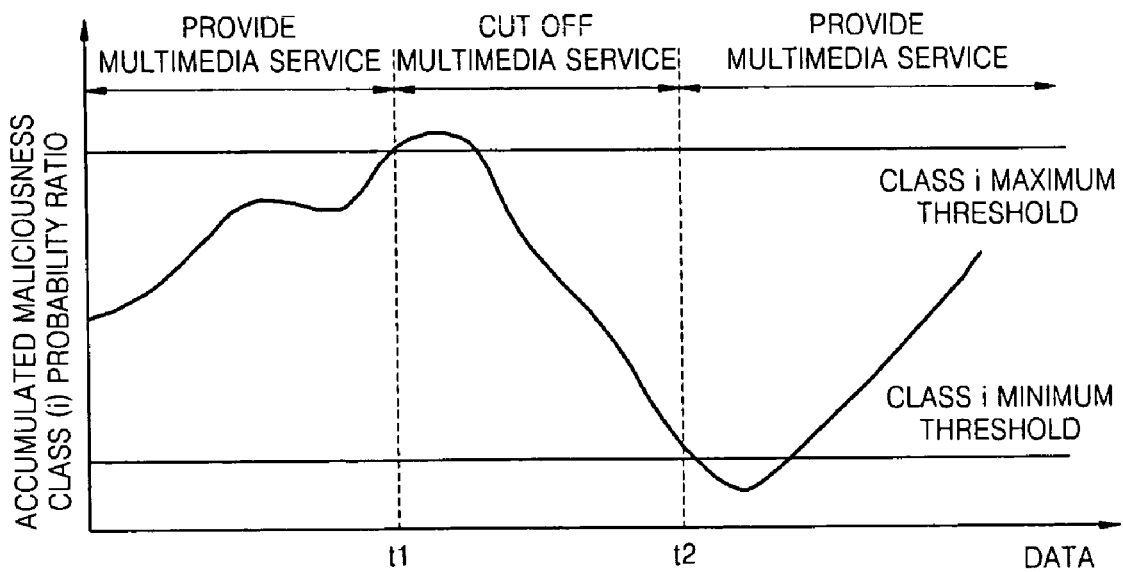
FIG. 6B illustrates a result of providing a service with filtering malicious moving pictures according to another embodiment of the present invention.

FIG. 4 is a flowchart of a method of filtering a malicious multimedia service based on sequential data processing according to an embodiment of the present invention, and FIG. 5 is a detailed flowchart of an operation for determining whether or not moving pictures belong to a maliciousness class of FIG. 4 according to an embodiment of the present invention. FIGS. 6A and 6B illustrate results of providing services with filtering malicious moving pictures according to an embodiment of the present invention.

First, referring to FIGS. 1 and 4, the apparatus and method according to an embodiment of the present invention will now be explained broadly. The apparatus includes a maliciousness classification model training unit 110, a malicious data classification unit 120, and a malicious information filtering unit 130. The maliciousness classification model training unit 110 receives an input of multimedia data whose maliciousness degree is known in advance, extracts a feature with which a maliciousness class can be classified, and generates a malicious information classification model through machine training in operation S410. The maliciousness data classification unit 120 calculates the maliciousness class probability of data, by using the malicious information classification model generated in the maliciousness classification model training unit 110 in operation S420. By using the maliciousness class probability of a data item measured at a predetermined time and a ratio calculated in relation to up to the previous data item, an accumulated maliciousness class ratio is calculated and the maliciousness class of the multimedia service is determined in operation S430. The malicious information filtering unit 130 cuts off a service that is classified as a maliciousness class, and continues to provide services that are not classified as a maliciousness class.

Referring to FIG. 2, the maliciousness classification model training unit 110 is divided into a compressed domain unit 210 generating a compressed domain maliciousness classification model (a first determination model) when sample data (training moving pictures) is compressed, and a non-compressed domain unit 220 generating a non-compressed domain maliciousness classification model (a second determination model). A first feature extraction unit 211 extracts a feature with which the class of malicious data in the sample data can be classified. A first machine training unit 213 receives the input of the feature and performs machine training. A first model generation unit 215 receives the input of the result of the machine training and generates and outputs the first determination model.

In the non-compressed domain unit 220, a decompression unit 221 decodes sample data to decompress the data, and outputs the result. A second feature extraction unit 223 extracts a feature with which the class of malicious data in the decompressed sample data can be classified. A second machine training unit 225 receives the input of this feature and performs machine training. A second model training unit 227 receives the input of the result of the machine training and generates and outputs the second determination model. The process here is performed in operation S410.

Figure 3B:
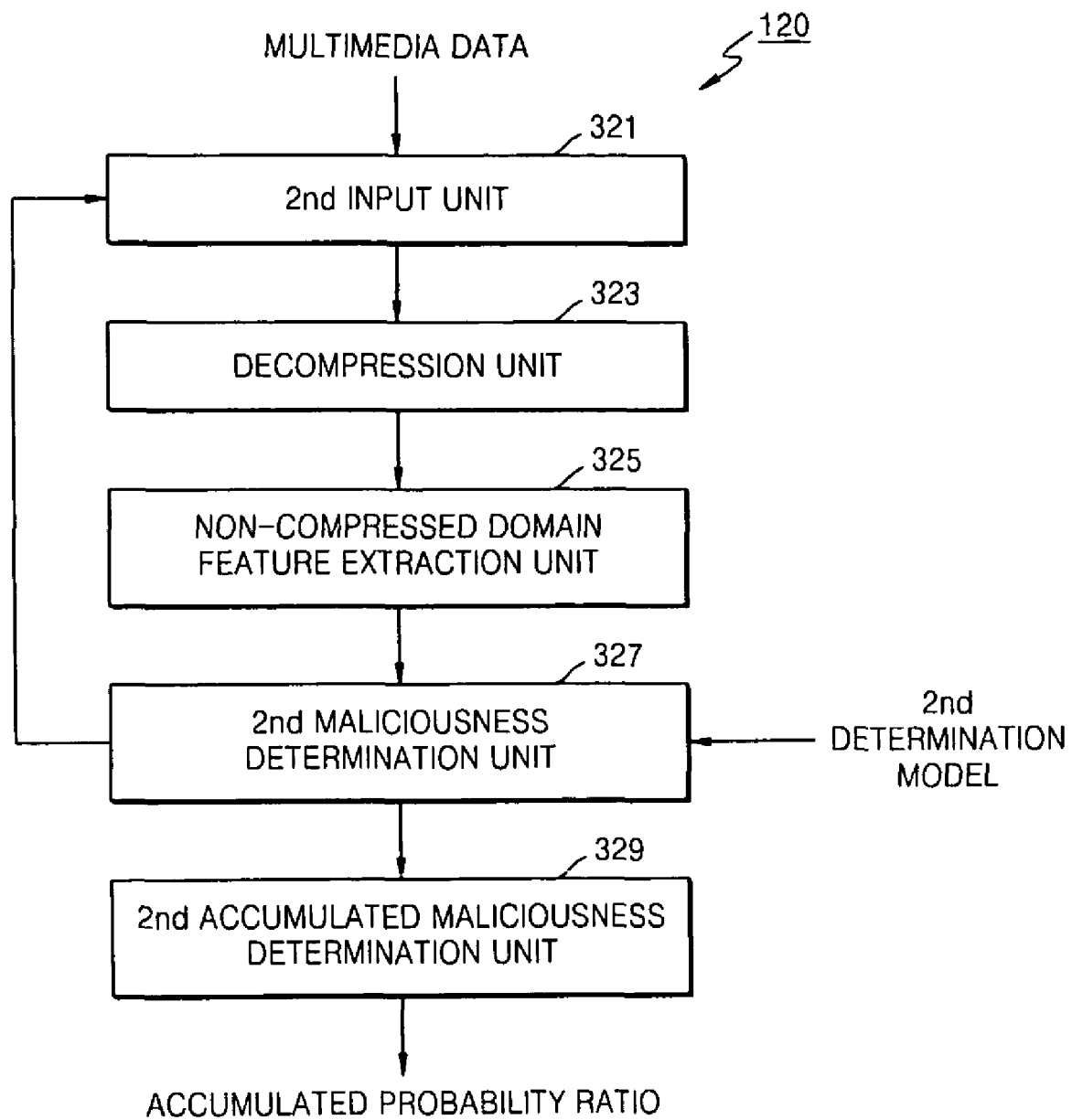
FIG. 3B is a block diagram of a detailed structure of a malicious data classification unit of FIG. 1 according to another embodiment of the present invention.
Figure 3C:
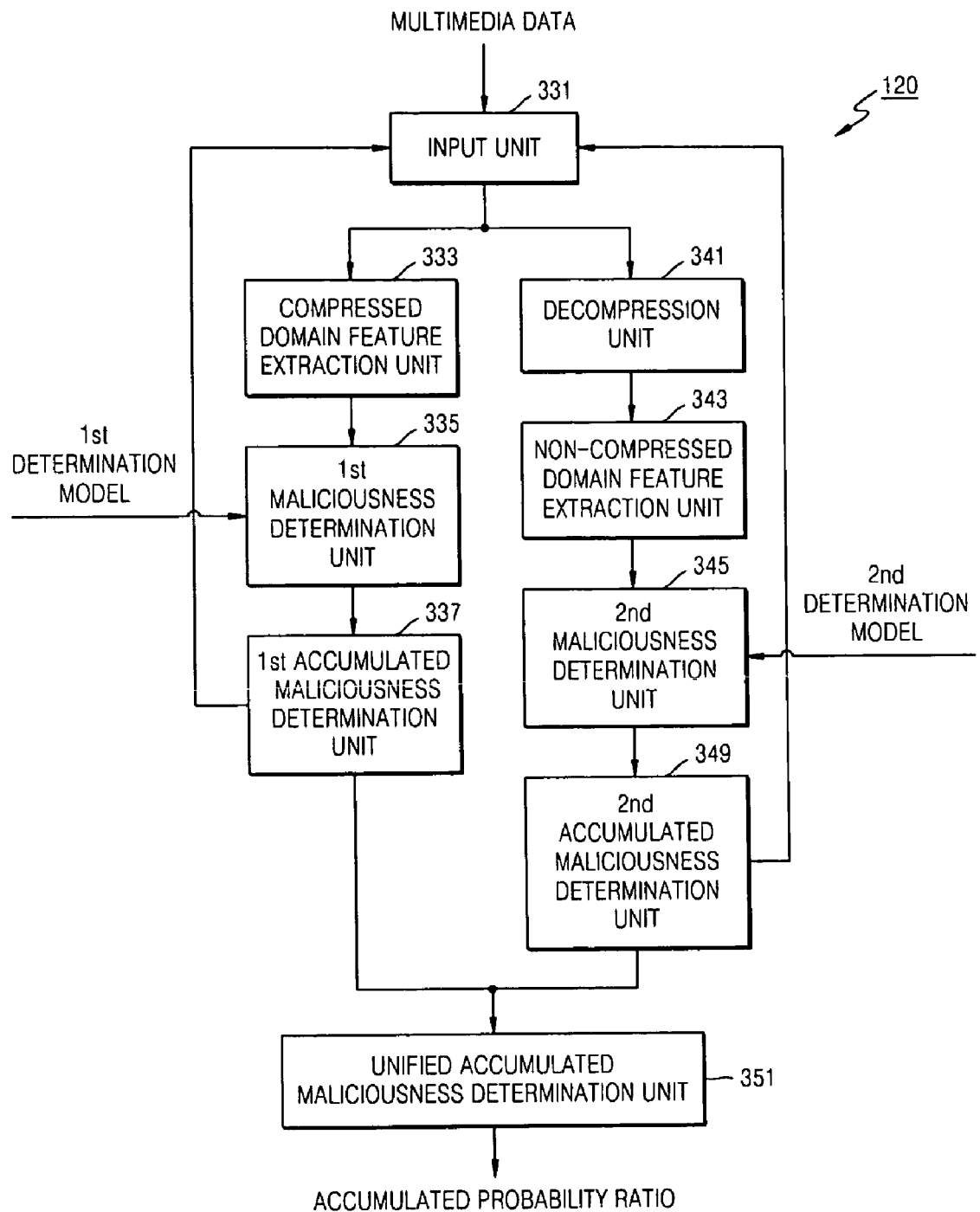
FIG. 3C is a block diagram of a detailed structure of a malicious data classification unit of FIG. 1 according to another embodiment of the present invention.

The malicious data classification unit 120 sequentially receives moving pictures that require maliciousness determinations in operation S420. By inserting the moving pictures in the first and second determination models, a probability ratio that data at a predetermined time for which determination is performed is included in a predetermined maliciousness class and an accumulated probability ratio are calculated so that it can be determined whether or not the data is malicious in operation S430. FIG. 3A shows a case where a maliciousness classification model in a compressed domain (hereinafter referred to as a 'first determination model') is used and FIG. 3B shows a case where a maliciousness classification model in a non-compressed domain (hereinafter referred to as a 'second determination model') is used. FIG. 3C shows a case where both of the models are used.

First, if it is determined whether or not input moving pictures that require determination of maliciousness are in a compressed domain in operation S501, if the maliciousness determination is in a non-compressed domain, the moving pictures are decompressed in operation 503, and if the maliciousness determination is in a compressed domain, the decompression operation is not needed. After the decompression, identical processes are performed for the moving pictures.

Referring to FIG. 3A, if a first determination model is used, a first input unit 311 receives the input moving pictures sequentially, and transfers data items one by one to a compressed domain feature extraction unit 313. The compressed domain feature extraction unit 313 extracts the feature of the data in operation S505, and transfers the feature to a first maliciousness determination unit 315. The first maliciousness determination unit 313 calculates a maliciousness class probability ratio by using the first determination model in operation S507. A first accumulated maliciousness determination unit 317 finally determines the maliciousness class of the input moving pictures by considering the maliciousness class probability ratio calculated in the first maliciousness determination unit 313 and a maliciousness class ratio of data items previous to the determination time in operations S508 through S513.

A malicious information filtering unit 130 provides the multimedia service to users if the input moving pictures are determined to be included in a harmless class. When only part of the input moving pictures includes a malicious part and the service should be cut off entirely in that case, the determination process is finished, and when only part of the input moving pictures includes a malicious part and the service of the input moving pictures is selectively cut off, the above process is repeatedly performed in operation S515.

Referring to FIG. 3B, a case where a second determination model is used will now be explained. Here, unlike FIG. 3A, a decompression unit 323 is further disposed and a process of decompressing data is required in operation S503. A second input unit 321 transfers the input moving pictures to the decompression unit 323. The decompression unit 323 decodes the input moving pictures and sequentially transfers the result to a non-compressed domain feature extraction unit 325. The non-compressed domain feature extraction unit 325 extracts the feature of the data in operation S505, and transfers the feature to a second maliciousness determination unit 327. The second maliciousness determination unit 327 calculates a maliciousness class probability ratio by using the second determination model in operation S507.

A second accumulated maliciousness determination unit 329 finally determines the maliciousness class of the input moving pictures by considering the maliciousness class probability ratio calculated in the second maliciousness determination unit 327 and a maliciousness class ratio of data items previous to the determination time in operations S508 through S513. The malicious information filtering unit 130 provides the multimedia service to users if the input moving pictures are determined to be included in a harmless class. When only part of the input moving pictures includes a malicious part and the service should be cut off entirely in that case, the determination process is finished, and when only part of the input moving pictures includes a malicious part and the service of the input moving pictures is selectively cut off, the above process is repeatedly performed in operation S515.

The method of determining maliciousness will now be explained in more detail. Referring to FIG. 3A, the malicious data classification unit 120 sequentially receives data from the multimedia service (input moving pictures) through the first input unit 311. If the input unit 311 transfers a t-th data item ($y_t$) to the compressed domain feature extraction unit 313, the compressed domain feature extraction unit 313 extracts t-th compressed data feature $F_t$ from the data ($y_t$) in operation S505. The extracts t-th compressed data feature $F_t$ has n elements as the following equation 1:

$$F_t = (f_{t1}, f_{t2}, f_{t3}, \ldots, f_{tn}) \quad (1)$$

The first maliciousness determination unit 315 calculates a probability $P_i(y_t)$ that the t-th compressed data item is maliciousness class i, and a probability $P_n(y_t)$ that the t-th compressed data item is not maliciousness class i, by using the first determination model with the t-th compressed data feature $F_t$, and calculates a probability ratio $S_{it}$ in relation to class i for the i-th compressed data item as the following equation 2:

$$S_{it} = \frac{P_i(y_t)}{P_n(y_t)} \quad (2)$$

By using the probability ratio $S_{it}$ in relation to maliciousness class i or the i-th compressed data item, the first accumulated maliciousness determination unit 317 calculates the accumulated probability ratio $S_{i,1:t}$ in relation to the maliciousness class i to the t-th compressed data item according to the following equation 3:

$$S_{i,1:t} = \frac{P_i(y_{1:t})}{P_n(y_{1:t})} \quad (3)$$

The process here is performed in operation S507.

By using the accumulated probability ratio $S_{i,1:t}$ in relation to the maliciousness class i to the t-th compressed data item, the first accumulated maliciousness determination unit 317 determines a maliciousness class according to the following equation 4:

$$D = R_i, \text{ if } S_{i,t} < -a_i \text{ where } -a_i < 0$$

$$D \neq R_i, \text{ if } S_{i,t} < b_i \text{ where } b_i > 0 \quad (4)$$

In the first accumulated maliciousness determination unit 317, it is determined whether or not the accumulated probability ratio $S_{i,1:t}$ is greater than a maximum threshold ($b_i$) for class i in operation S508.

If the accumulated probability ratio $S_{i,1:t}$ is greater, it is determined that the i-th data item is class i in operation S509. If the accumulated probability ratio $S_{i,1:t}$ is less than the maximum threshold ($b_i$), it is determined whether or not the accumulated probability ratio $S_{i,1:t}$ is less than a minimum threshold ($a_i$) in operation S511. If the accumulated probability ratio $S_{i,1:t}$ is less than the minimum threshold ($a_i$), it is determined that the i-th data item is not class i in operation S513. If the accumulated probability ratio $S_{i,1:t}$ is greater than the minimum threshold ($a_i$), the accumulated probability ratio $S_{i,1:t}$ is between the maximum threshold and the minimum threshold of class i. Accordingly, a (t+1)-th data item is input and the process described above is repeated in operation S515.

Referring to FIG. 3B, a process in the non-compressed domain will now be explained. If the second input unit 321 transfers a t-th data item ($y_t$) to the decompression unit 323, the decompression unit 323 decodes the compressed data and outputs the result in operation S503. The non-compressed domain feature extraction unit 325 receives the input of the decompressed data ($x_t$), and extracts the t-th compressed data feature ($U_t$) in operation S505.

The t-th decoded data feature ($U_t$) may be extracted from a variety of media, such as voice and images, and has n elements as the following equation 5:

$$U_t = (u_{t1}, u_{t2}, u_{t3}, \ldots, u_{tn}) \quad (5)$$

The second maliciousness determination unit 327 calculates a probability $P_i(x_t)$ that the t-th compressed data item is maliciousness class i, and a probability $P_n(x_t)$ that the t-th compressed data item is not maliciousness class i, by using the second determination model with the t-th compressed data feature $U_t$, and calculates a probability ratio $S_{it}$ in relation to class i for the i-th compressed data item as the following equation 6:

$$S_{it} = \frac{P_i(x_t)}{P_n(x_t)} \quad (6)$$

By using the probability ratio $S_{it}$ in relation to maliciousness class i for the i-th compressed data item, the second accumulated maliciousness determination unit 329 calculates the accumulated probability ratio $S_{i,1:t}$ in relation to the maliciousness class i to the t-th compressed data item according to the following equation 7:

$$S_{i,1:t} = \frac{P_i(x_{1:t})}{P_n(x_{1:t})} \quad (7)$$

The process here is performed in operation S507.

By using the accumulated probability ratio $S_{i,1:t}$ in relation to the maliciousness class i to the t-th compressed data item, the second accumulated maliciousness determination unit 329 determines a maliciousness class according to the following equation 8:

D=$R_i$, if $S_{i,t}$<-$a_i$ where -$a_i$<0

D≠$R_i$, if $S_{i,t}$<$b_i$ where $b_i$>0 (8)

In the second accumulated maliciousness determination unit 329, it is determined whether or not the accumulated probability ratio $S_{i,1:t}$ is greater than a maximum threshold ($b_i$) for class i in operation S508. If the accumulated probability ratio $S_{i,1:t}$ is greater, it is determined that the i-th data item is class i in operation S509. If the accumulated probability ratio $S_{i,1:t}$ is less than the maximum threshold ($b_i$), it is determined whether or not the accumulated probability ratio $S_{i,1:t}$ is less than a minimum threshold ($a_i$) in operation S511. If the accumulated probability ratio $S_{i,1:t}$ is less than the minimum threshold ($a_i$), it is determined that the i-th data item is not class i in operation S513. If the accumulated probability ratio $S_{i,1:t}$ is greater than the minimum threshold ($a_i$), the accumulated probability ratio $S_{i,1:t}$ is between the maximum threshold and the minimum threshold of class i. Accordingly, a (t+1)-th data item is input and the process described above is repeated in operation S515.

FIG. 3C shows another detailed structure of the malicious data classification unit 120 of FIG. 1. In the malicious data classification unit 120 of FIG. 3C, the operations in the compressed domain feature extraction unit 333, the first maliciousness determination unit 335, and the first accumulated maliciousness determination unit 347 are the same as those in FIG. 3A, and the operations in the decompression unit 341, the non-compressed domain feature extraction unit 343, and the second accumulated maliciousness determination unit 349 are the same as those in FIG. 3B. The operation of the input unit 311 is also the same. Accordingly, those explanations will be omitted here. However, a unified accumulated maliciousness determination unit 351 finally determines the maliciousness class of the multimedia service, by unifying the maliciousness class determination results in the compressed domain and the non-compressed domain.

FIGS. 6A and 6B show a method of filtering malicious moving pictures by the malicious information filtering unit 130.

First, referring to FIG. 6A, since the accumulated maliciousness class probability ratio before a determination time (t) is less than a maximum threshold with which data is determined to be class i, the service is provided, but after the determination time t, the accumulated ratio exceeds the maximum threshold and the service is cut off.

Meanwhile, referring to FIG. 6B, since the accumulated maliciousness class probability ratio is less than the maximum threshold of maliciousness class i before determination time t1, the service is provided. However, immediately after the time t1, the accumulated ratio exceeds the maximum threshold and the service is cut off. Again however, since the accumulated maliciousness class probability ratio is less than maliciousness class i at determination time t2, the service is resumed.

As described above, the characteristics of the present invention includes that features are extracted from compressed data and used in order to enhance the speed and performance of classifying malicious multimedia service classes. The maliciousness class is not determined only by using data at a predetermined time, but is determined by information correlating past data and data at a predetermined time, and when the maliciousness class of data is determined, a machine-training-based maliciousness class classification model is used. Also, by sequentially processing data, the present invention is made to be appropriate to filtering both real-time and non-real time malicious multimedia service.

The method of filtering malicious multimedia using sequential data processing according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Also, the font ROM data structure according to the present invention can be implemented as computer readable codes on a recording medium such as ROM, RAM, CD-ROMs, magnetic tapes, floppy disks, flash memory, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the method and apparatus for filtering malicious multimedia service using sequential data processing of the present invention as described above, maliciousness classes of multimedia data are quickly and accurately classified through the sequential data processing technique. Accordingly, the method and apparatus can be usefully applied to services of examining malicious multimedia existing in a storage space, examining maliciousness of multimedia data being reproduced, and examining maliciousness of real-time streaming services.

Also, with the present invention, examination of the maliciousness class of a multimedia file existing in a storage space can be performed more quickly than the conventional method of determining maliciousness based on entire data. In case of multimedia data that is partially malicious, only the malicious part can be selectively extracted or cut off.

Furthermore, when the maliciousness of a multimedia service is determined, a feature with which a maliciousness class can be determined can be extracted from a compressed domain and therefore the feature extraction speed is fast. When the maliciousness class of data is classified, a method based on a rule, such as presence of a predetermined color or a ratio, is not used, but a maliciousness class classification model based on machine training is used such that the accuracy and speed of the maliciousness class classification of data are high.

Also, since the sequential data processing technique is used, it is appropriate to cutting off malicious multimedia services in which data is input sequentially in real time.

The conventional classification depending on data at a predetermined time is not used, but correlated information between past accumulated data and data at a predetermined time is analysed and used and therefore the accuracy of classification is high.

Also, since the accumulated value of resulting values obtained by sequentially processing data is used, both past information and data at the predetermined time can be utilized as bases for determination, without depending only on data at a predetermined time. The determination performance can also be enhanced through analysis of the correlated information between continuous data items.

When the maliciousness of data at a predetermined time is determined, unlike the conventional method using only simple information, such as the presence ratio of a predetermined color, the maliciousness classification model that is a machine-training result in relation to high-level features extracted from data of a compressed domain or a non-compressed domain is used such that the performance of the maliciousness class classification is excellent.

Finally, when a maliciousness class is classified by extracting the feature of data only from a compressed domain, malicious multimedia services can be classified much faster. When a maliciousness class is classified by extracting the feature of data from a non-compressed domain, the time taken for classification increases, but the accuracy can be increased much higher. Also, a maliciousness class can be classified by extracting the feature of data from both a compressed domain and a non-compressed domain according to selection by a user, and in this case, the performance of the classification is enhanced much.

What is claimed is:

1. A malicious multimedia filtering apparatus based on sequential data processing, the apparatus comprising:
    a maliciousness classification model training unit extracting a predetermined feature from at least one or more types of moving pictures and then, through machine training, generating a maliciousness determination model for each of at least one or more classes;
    a malicious data classification unit sequentially inputting input moving pictures for which maliciousness is required to be determined, to the maliciousness determination model, and determining the maliciousness class of the input moving pictures, based on a probability that data at a determination time of the input moving pictures a probability that data at a determination time of the input moving pictures, and an accumulated maliciousness probability to a current time,
    wherein the maliciousness class is determined based on the probability that data at the determination time of the input moving pictures and previous probabilities of previous data of the sequentially inputted moving pictures for belonging to the determined maliciousness class of at least one second time, and
    where the second time is before the determination time of the sequentially inputted moving pictures and is within a time frame for generating accumulating maliciousness probabilities before the determination time; and
    a malicious information filtering unit cutting off the service if the maliciousness class belongs to a predetermined reference maliciousness class.

2. The apparatus of claim 1, wherein the maliciousness classification model training unit comprises:
    a compressed domain model training unit extracting the feature from compressed moving pictures whose maliciousness class is known, performing machine training, including a support vector machine (SVM), and generating a first determination model; and
    a non-compressed domain model training unit extracting the feature from non-compressed moving pictures whose maliciousness class is known, performing machine training, including an SVM, and generating a second determination model.

3. The apparatus of claim 1, wherein the malicious data classification unit comprises:
    an input unit receiving input moving pictures and sequentially outputting the input moving pictures;
    an extraction unit extracting the feature from the input moving pictures sequentially being output, and outputting the feature;
    a maliciousness determination unit inputting the feature to the maliciousness classification and calculating a maliciousness class probability ratio that the data of the input moving pictures at a predetermined determination time belongs to a predetermined maliciousness class; and
    an accumulated maliciousness determination unit calculating an accumulated maliciousness probability ratio obtained by the accumulating maliciousness probabilities before the determination time, based on the maliciousness class probability ratio, and determining whether or not the input moving pictures belong to the maliciousness class.

4. The apparatus of claim 3, wherein the malicious data classification unit further comprises a decompression unit decoding the input moving pictures, if the input moving pictures are compressed, and then outputting the result to the extraction unit.

5. The apparatus of claim 3, wherein the maliciousness determination unit obtains the maliciousness class probability ratio from a ratio of a probability that the data of the input moving pictures at the determination time belongs to the maliciousness class to a probability that the data of the input moving pictures at the determination time do not belong to the maliciousness class.

6. The apparatus of claim 3, wherein if the maliciousness class probability ratio is greater than the maximum threshold of the maliciousness class, the accumulated maliciousness determination unit determines that the moving pictures belong to the maliciousness class; if the maliciousness class probability ratio is less than the minimum threshold of the maliciousness class, the accumulated maliciousness determination unit determines that the moving pictures do not belong to the maliciousness class; and if the maliciousness class probability ratio is between the maximum threshold and the minimum threshold of the maliciousness class, the accumulated maliciousness determination unit repeats the determination process for a next data item of the moving pictures.

7. The apparatus of claim 1, wherein if it is determined that the moving pictures belong to the maliciousness class, the malicious information filtering unit determines that the maliciousness class determination process is continuously performed while cutting off outputting data to an external apparatus.

8. A malicious multimedia filtering method based on sequential data processing, the method comprising:

extracting a predetermined feature from at least one or more types of moving pictures and then, through machine training, generating a maliciousness determination model for each of at least one or more classes;

sequentially receiving an input of input moving pictures for which maliciousness is required to be determined, and inserting the moving pictures to the maliciousness determination model;

based on a probability ratio that a data item at a determination time when maliciousness is determined through the inserting belongs to a predetermined maliciousness class and an accumulated probability ratio to the determination time, determining whether or not the data item belongs to the maliciousness class, wherein the predetermined maliciousness class is determined based on the probability that data at the determination time of the received input moving pictures and previous probabilities of previous data of the sequentially received inputted moving pictures for belonging to the determined predetermined maliciousness class of at least one second time, and where the second time is before the determination time of the sequentially received inputted moving pictures and is within a time frame for generating accumulating maliciousness probabilities before the determination time; and cutting off the service if the maliciousness class belongs to a predetermined reference maliciousness class.

9. The method of claim 8, wherein in the extracting of the predetermined feature, and the generating of the maliciousness determination model, by performing machine training after extracting a predetermined feature from compressed moving pictures and non-compressed moving pictures, the maliciousness determination model for each maliciousness class is generated.

10. The method of claim 8, wherein the determining of whether or not the data item belongs to the maliciousness class comprises:

determining whether or not the input moving pictures are of a compressed domain;

if the determination result indicates that the input moving pictures are of a non-compressed domain, extracting a predetermined feature from the input moving pictures and if the determination result indicates that the input moving picture are of a compressed domain, decompressing the moving pictures and then extracting the feature; and by inserting the feature to the maliciousness determination model, calculating a maliciousness probability ratio that is a ratio of a probability that the data item at a determination time belongs to a predetermined maliciousness class, to a probability that the data item at the determination time does not belong to a predetermined maliciousness class; and determining a maliciousness class, by calculating the accumulated probability ratio to the determination time based on the maliciousness probability ratio.

11. The method of claim 10, wherein the determining of the maliciousness class comprises:

comparing the maliciousness class probability ratio with a maximum threshold of the maliciousness class; and if the comparison result indicates that the maliciousness class probability ratio is greater than the maximum threshold of the maliciousness class, determining that the moving pictures belong to the maliciousness class, and if the maliciousness class probability ratio is less than the minimum threshold of the maliciousness class, determining that the moving pictures do not belong to the maliciousness class, and if the maliciousness class probability ratio is between the maximum threshold and the minimum threshold of the maliciousness class, performing again from the extracting of the feature for a data item of the input moving pictures at a next determination time.

12. The method of claim 8, wherein the cutting off of the service further comprises resuming the service if the maliciousness class of the input moving pictures that are input after stopping the service is less than the minimum threshold of the reference maliciousness class.

\* \* \* \* \*